June 10, 1941.   I. E. MUSKAT ET AL   2,245,076
CHLORINATION OF TITANIUM BEARING MATERIALS
Filed Dec. 22, 1939
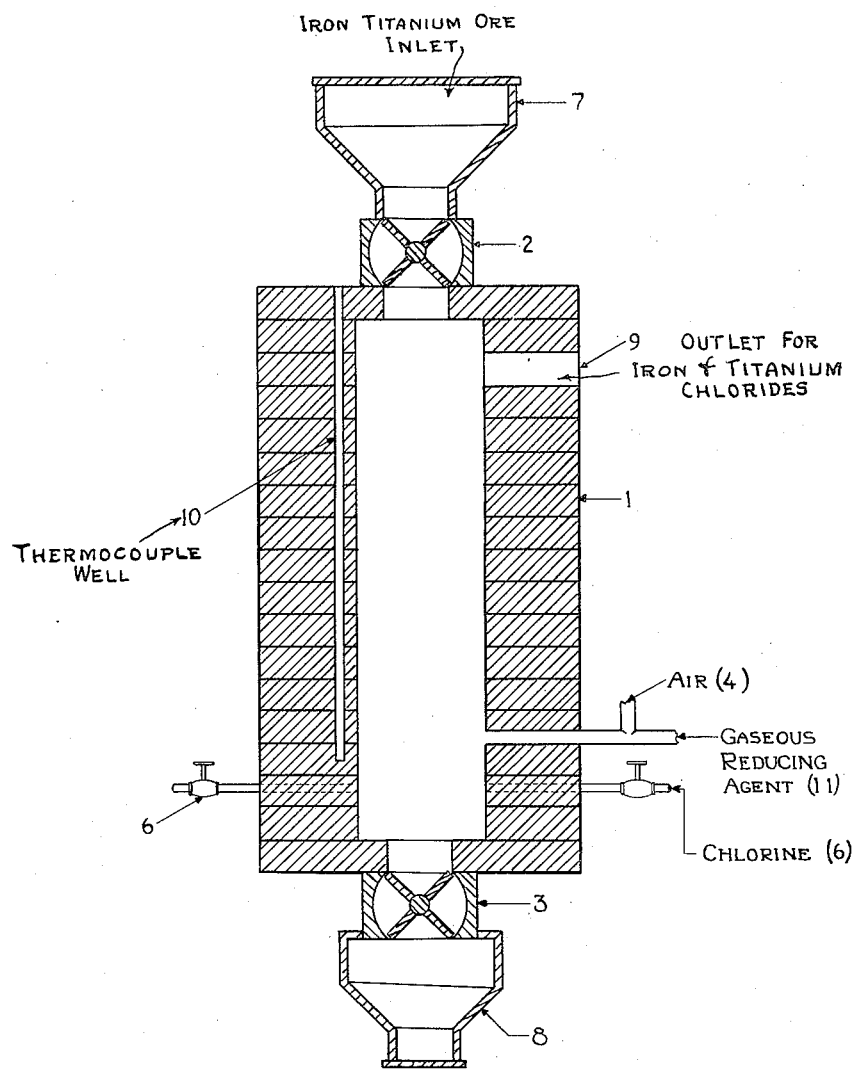
INVENTOR.
IRVING E. MUSKAT
& ROBERT H. TAYLOR
BY
ATTORNEY.

Patented June 10, 1941

2,245,076

UNITED STATES PATENT OFFICE 2,245,076

CHLORINATION OF TITANIUM BEARING MATERIALS

Irving E. Muskat and Robert H. Taylor, Akron, Ohio, assignors to Pittsburgh Plate Glass Company, Allegheny County, Pa., a corporation of Pennsylvania Application December 22, 1939, Serial No. 310,538

14 Claims. (Cl. 75—112)

This invention relates to the chlorination of titanium bearing materials and is particularly adapted to the chlorination of materials containing titanium oxides such as ilmenite ore and to the recovery of values therefrom.

It has been found that in order to secure satisfactory chlorination of such materials it is necessary to chlorinate at elevated temperatures and prior to the present invention, it has been considered essential to conduct the chlorination in an externally heated receptacle such as a retort. This has required the use of receptacles which are made of materials of high conductivity and, in general, such materials are attacked rapidly by chlorine at the temperature of operation.

In accordance with our invention, we have found that the chlorination may be conducted without recourse to an externally heated reactor. The process is adapted to the treatment of titanium bearing materials containing from 15 to 50 percent or more of titanium and generally above 10 percent and up to 50 percent of iron and is particularly adapted to the treatment of titanium bearing ores such as ilmenite which contain 20 to 50 percent of titanium and 10 to 40 percent of iron. Other ores such as titanomagnetite, or titanium bearing residues, such as are secured in accordance with the process described in our copending application 205,323, filed April 30, 1938, also may be chlorinated. The chlorination is conducted in the presence of the required amount of a gaseous reducing agent such as carbon monoxide, phosgene, hydrogen, sulphurchloride, carbon tetrachloride, sulphur vapor, etc. in a suitable furnace with the consequent production of vapors of iron and titanium tetrachloride. These vapors may be condensed and the chlorides therein separated by suitable means. We have found that if the chlorination is conducted at a temperature not less than 600° C. and preferably above 700° C., the reaction proceeds with such rapidity that the heat evolved by the reaction is sufficient to maintain reaction temperature without externally heating the reactor. Thus, by regulating the rate of introduction of ore, carbon monoxide or similar gaseous reducing agent, and chlorine into the reactor, it is possible to maintain the temperature therein. This is not possible when the chlorination temperature is below 600° C. In order to achieve optimum efficiency and yield, the temperature should be maintained above 700° C., maximum efficiency being secured at 850–1250° C. Thus, when an ore such as ilmenite is chlorinated at a temperature of about 700° C. or above, the temperature of reaction may be maintained through careful periodical observation of temperature and regulation of the rate of introduction of chlorine, ore and carbon monoxide or similar gaseous reducing agent. In such a case it is found possible to secure a good utilization of the chlorine introduced and to secure chlorination of the major portion of the ore without difficulty. When the temperature is maintained at 850–1250° C. maintenance of temperature within the reactor is considerably easier and less adjustment of the rate of addition of ore, carbon monoxide and chlorine is required. In addition, chlorine utilization under such conditions generally exceeds 90 percent, and in excess of 80 percent of the ore is generally chlorinated.

In the treatment of ores such as ilmenite or other titanium bearing residues, particularly oxides of titanium, it is found that the required concentration of reducing agent is rather critical. Thus, by varying the amount of reducing agent it is possible to conduct the chlorination so as to remove iron and to produce a titanium residue which contains only a minor quantity of iron or the chlorination may be conducted to form and volatilize both iron and titanium chlorides in substantial amount. Often it is desirable to use equimolecular quantities of chlorine and carbon monoxide, hydrogen, or similar gaseous reagent and in such a case phosgene may be used in lieu of chlorine and carbon monoxide, if desired. In many cases, however, it is desirable to use excess chlorine, particularly when a mixture of ore and carbon is chlorinated.

In general, the total carbon introduced into the furnace in the form of carbon monoxide, carbon tetrachloride, phosgene, or solid reducing agent such as carbon or a carbonaceous material i. e. coke, peat, etc., should be in slight excess of the quantity theoretically necessary to reduce the iron component of the ore to its metallic state if it is desired to conduct the chlorination to remove iron without removal of titanium. Similarly, if it is desired to chlorinate both iron and titanium components the total carbon present may be correspondingly raised at least to the concentration theoretically required to reduce both the iron and titanium to the metallic state. Thus, if the concentration of reducing agent is relatively low, iron chloride is formed and volatilized without substantial removal of titanium, while if the reducing agent concentration is high, both iron and titanium chlorides are formed.

The process may be conducted in a suitable apparatus such as a shaft furnace as illustrated and described in our copending applications Serial No. 205,322 and 206,219, filed April 30, 1938, now Patents No. 2,184,884 and 2,184,885, and Serial No. 282,198, filed June 30, 1939, now Patent No. 2,184,887. This apparatus may comprise a suitable shaft furnace 1 which may be constructed from firebrick or other resistant refractory material and which is provided with chlorine tuyères 6 and one or more tuyères 5 provided with inlets 4 and 6 for introduction of air and/or gaseous reducing agent and is connected through outlet 9 to a series of condensers (not shown). In the ordinary operation of the furnace a charge of coke or other carbonaceous material may be introduced into the furnace, a blast of oxygen or air introduced through the tuyères and the coke ignited. When the temperature has reached a suitable value, for example 850° C., a charge of briquettes or ore which may contain carbon may be introduced through a furnace inlet from a storage hopper 7, by means of a suitable feeding device such as a star feeder 2. At this time introduction of oxygen or air may be discontinued and phosgene or chlorine and carbon monoxide or similar gaseous reducing agent is introduced into the furnace through the tuyères. The chlorine flow rate and the carbon monoxide are adjusted in accordance with the amount of ore introduced so that the amount of chlorine and reducing agent introduced is sufficient for complete chlorination. Additions of ore may be either continuous or intermittent. The base of the furnace may be provided with a suitable discharge device 3, for discharging unchlorinated residue into hopper 8. The furnace may be provided with a well 10, by insertion of thermocouple wires in order to measure the temperature at various points within the furnace. The iron and titanium chlorides which volatilize are withdrawn through outlet 9 and may be led to condensers where they may be condensed by convenient methods.

The ore may be chlorinated in a coarse or finely ground state or in the form of briquettes or other suitable form and may be mixed with more or less carbonaceous material such as charcoal, coke or the like, or if desired, the carbon may be omitted. If desired, the ore may be ground to minus 100 mesh or finer, and intimately intermixed with some finely divided carbonaceous material, such as peat, petroleum or coal coke, charcoal, etc., the degree of intermixing being that required to obtain a composition which is approximately homogeneous.

We have found it desirable to briquette finely ground carbon-ore mixtures prior to chlorination. These briquettes may be bonded with a suitable binder such as molasses, tar, still-residue derived from a distillation of mineral oils, asphalt, bitumen, sodium silicate, hydrated titanium dioxide, or other convenient adhesives. Where the binder is carbonaceous, a corresponding reduction in the amount of reducing agent introduced into the furnace during treatment may be permissible. Care should be taken in forming the briquettes to insure sufficient porosity to permit penetration by the chlorine. The briquettes may be preheated before introduction into the furnace or they may be introduced cold. In general, it is desirable to preliminarily bake the briquettes in order to eliminate hydrocarbons which may volatilize during the chlorination. If desired, the baked briquettes may be discharged into the furnace from the baking oven and while they are hot.

In order to start the process the furnace may be preheated and when it has been heated to a desirable temperature above 600° C., an initial charge of ore may be introduced. The furnace may be preheated by any suitable method such as by introducing coke, peat or other carbonaceous material into the furnace and sufficient air or oxygen to ignite and burn the carbon. Ore containing carbon, if desired, may be introduced upon the burning carbon, and chlorine, carbon monoxide, or other reducing agent are introduced to initiate the chlorination reaction. Further charges of ore and carbon monoxide may be introduced as the reaction proceeds. When the temperature exceeds 600° C., it is found that the chlorination reaction occurs with such rapidity and with sufficient evolution of heat that the temperature may be maintained without further introduction of air or oxygen for combustion purposes.

As an alternative method of initiating the reaction, the briquettes or charge of ore may be heated prior to introduction into the furnace to a temperature above 600° C., and preferably 850–1250° C., and chlorine and carbon monoxide introduced into the heated charge. In addition, the furnace may be preheated by other methods such as by heating the interior thereof by introducing and burning natural gas or similar gas into the furnace to preheat the furnace to a temperature above 600° C.

In order to keep the process in continuous operation, it is preferred to introduce the ore, carbon monoxide, and chlorine at such a rate that the temperature is maintained above 600° C., preferably at 850–1250° C. Ordinarily this may be done by regulating the rate of introduction of chlorine, carbon monoxide and ore in accordance with periodic or continuous observation of the temperature in the reactor. Thus, if the temperature begins to decrease, the rate of introduction of the chlorine and of the ore and carbon monoxide may be increased while if the temperature increases, the rate of ore, carbon monoxide and chlorine introduction may be decreased. It will also be understood that the temperature may be regulated to some degree by the rate of withdrawal of the chlorinated residue. Thus, a large amount of heat may be dissipated by rapid removal of the residue and the reactor cooled by the incoming cool ore.

Occasionally, the heat developed during the reaction is so great the temperature of the reaction zone approximates the sintering temperature of the ore. The reaction may be cooled, if desired, by introduction of a diluent gas such as nitrogen or carbon dioxide by the use of chlorine diluted with these or other diluents. Carbon dioxide appears to be particularly effective as a cooling gas in the reaction. Since substantially uniform results may be secured throughout the range of 850–1250° C., considerable latitude in temperature regulation may be permissible so long as the temperature remains within this range. The process may be continued for an extended length of time without application of external heat to the furnace. Accordingly, it is possible to construct the furnace of materials which are highly resistant to the corrosive action of chlorine at the temperature of operation. Since it is unnecessary to apply external heat to the furnace, the use of heat conductive furnace construction materials is unnecessary, in fact such materials are in general undesirable since it is usually preferred to construct the furnace of heat insulating materials in order to prevent substantial loss of heat and consequent cooling of the reaction. Firebrick has been found to exhibit satisfactory resistance to the attack of chlorine and to possess suitable heat insulating qualities.

The following examples illustrate the invention as applied to ilmenite ore. Other iron-titanium ores may be treated in similar manner.

*Example I.*—A quantity of briquettes ¼ to ¾ inch in diameter was prepared from a mixture of 100 parts by weight of ilmenite ore, and 14 parts by weight of molasses by baking at 600° C., until the volatile hydrocarbons were substantially removed.

A shaft furnace having an internal diameter of 4 inches was preheated by a coke fire within the shaft to 1000° C. A charge of 5 pounds of briquettes and 3 pounds of coke was introduced and an air blast through the shaft maintained for 3 minutes to insure ignition of the added coke. At this time, 10 pounds of briquettes were added and chlorine introduced into the shaft to initiate the chlorination reaction. Chlorine and carbon monoxide were introduced into the shaft each at a rate of 50–60 liters per minute, while briquettes were added at the rate of 15 pounds per hour. For a period of over 24 hours the temperature of the reaction mass was very readily maintained at 940° C. to over 1000° C. An ash containing 15% $TiO_2$ and 5% Fe was withdrawn from the furnace. Since the quantity of this ash approximated 10% of the weight of the briquettes added, 96% of the titanium content of the ore was volatilized as titanium tetrachloride and 98% of the iron was volatilized as iron chloride.

*Example II.*—Using a furnace having an internal diameter of 15 inches which was preheated to a temperature of 1100° C., briquettes prepared from a mixture corresponding to 100 parts of ore to 13 parts C to 14 parts molasses were introduced at a rate of 120 pounds per hour, chlorine at 2.0 to 2.5 pounds per minute and carbon monoxide at 1.5 pounds per minute. The temperature remained at 850–1000° C. throughout the run without externally heating the furnace. The vapors were withdrawn from the furnace and cooled to 40° C. whereupon 85 percent of the ferric chloride and 25 percent of the titanium tetrachloride were simultaneously condensed. The condensed chlorides were transferred to another portion of the condenser where the titanium tetrachloride was revolatilized by heating while passing the exhaust gases of the furnace over the condensed chlorides.

*Example III.*—A quantity of briquettes ¼ to ½ inch in diameter was prepared from a mixture of 100 parts by weight of ore and 12 parts by weight of molasses by baking at 400–600° C. until the binder was substantially carbonized.

A shaft furnace having an internal diameter of 6½ inches was preheated by a coke fire within the shaft to 1100° C. A charge of 9 pounds of briquettes and 4 pounds of coke was introduced and an air blast through the shaft maintained for 5 minutes to insure ignition of the added coke. At this time, 10 pounds of briquettes were added and chlorine and carbon monoxide introduced into the shaft to initiate the chlorination reaction. The process was carried on continuously for many hours by introducing briquettes at a rate of 15–20 pounds per hour and chlorine at a rate of 40–50 liters per minute and carbon monoxide at a rate of 20–30 liters per minute, and withdrawing the treated residue at a rate required to keep the ore in the furnace at a constant level. The temperature remained at 850–1150° C. throughout the reaction. The product withdrawn from the bottom of the furnace contained 2.8–2.9 percent iron and 86.1 percent titanium dioxide. No external heat was required to maintain the reaction.

Although the present invention has been described with reference to specific details of certain embodiments thereof, it is not intended that such details shall be regarded as limitations upon the scope of the invention except insofar as included in the accompanying claims.

We claim:

1. A continuous process of chlorinating a titanium ore containing about 15 to 50 percent of titanium and 10 to 50 percent of iron which comprises chlorinating said ore in the presence of sufficient gaseous reducing agent to cause formation of iron chloride and a major quantity of titanium tetrachloride in the reaction zone of a reactor and introducing chlorine, gaseous reducing agent and ore therein at such a rate that the heat evolved by the chlorination reaction is developed with sufficient rapidity to maintain the temperature above 600° C. within at least a portion of said zone without externally heating said zone, whereby iron and titanium chlorides are formed and volatilized.

2. A continuous process of chlorinating a titanium ore containing about 15 to 50 percent of titanium and 10 to 50 percent of iron which comprises chlorinating said ore in the presence of sufficient gaseous reducing agent to cause formation of iron chloride and a major quantity of titanium tetrachloride in the reaction zone of a reactor and introducing chlorine, gaseous reducing agent and ore therein at such a rate that the heat evolved by the chlorination reaction is developed with sufficient rapidity to maintain the temperature above 700° C. within at least a portion of said zone without externally heating said zone, whereby iron and titanium chlorides are formed and volatilized.

3. A continuous process of chlorinating an ilmenite ore containing about 15 to 50 percent of ilmenite and 10 to 50 percent of iron which comprises chlorinating said ore in the presence of sufficient gaseous reducing agent to cause formation of iron chloride and a major quantity of titanium tetrachloride in the reaction zone of a reactor and introducing chlorine, gaseous reducing agent and ore therein at such a rate that the heat evolved by the chlorination reaction is developed with sufficient rapidity to maintain the temperature of about 850–1250° C. within at least a portion of the said zone without externally heating said zone, whereby iron and titanium chlorides are formed and volatilized.

4. A continuous process of chlorinating a titanium ore containing about 15 to 50 percent of titanium and 10 to 50 percent of iron which comprises chlorinating said ore in the presence of sufficient carbon monoxide to cause formation of iron chloride and a major quantity of titanium tetrachloride in the reaction zone of a reactor and introducing chlorine, carbon monoxide and ore therein at such a rate that the heat evolved by the chlorination reaction is developed with sufficient rapidity to maintain the temperature above 600° C. within at least a portion of said zone without externally heating said zone, whereby iron and titanium chlorides are formed and volatilized.

5. A continuous process of chlorinating a titanium ore containing about 15 to 50 percent of titanium and 10 to 50 percent of iron which comprises chlorinating said ore in the presence of sufficient carbon monoxide to cause formation of iron chloride and a major quantity of titanium tetrachloride in the reaction zone of a reactor and introducing chlorine, carbon monoxide and ore therein at such a rate that the heat evolved by the chlorination reaction is developed with sufficient rapidity to maintain the temperature above 700° C. within at least a portion of said zone without externally heating said zone, whereby iron and titanium chlorides are formed and volatilized.

6. A continuous process of chlorinating an ilmenite ore containing about 15 to 50 percent of ilmenite and 10 to 50 per cent of iron which comprises chlorinating said ore in the presence of sufficient carbon monoxide to cause formation of iron chloride and a major quantity of titanium tetrachloride in the reaction zone of a reactor and introducing chlorine, carbon monoxide and ore therein at such a rate that the heat evolved by the chlorination reaction is developed with sufficient rapidity to maintain the temperature of about 850–1250° C. within at least a portion of said zone without externally heating said zone, whereby iron and titanium chlorides are formed and volatilized.

7. A continuous process of chlorinating a titanium ore containing about 15 to 50 percent of titanium and 10 to 50 percent of iron which comprises chlorinating said ore in the presence of sufficient gaseous reducing agent to cause formation of iron chloride in the reaction zone of a reactor and introducing chlorine, gaseous reducing agent and ore therein at such a rate that the heat evolved by the chlorination reaction is developed with sufficient rapidity to maintain the temperature above 600° C. within at least a portion of said zone without externally heating said zone, whereby iron chloride is formed and volatilized.

8. A continuous process of chlorinating an ilmenite ore containing about 15 to 50 percent of titanium and 10 to 50 percent of iron which comprises chlorinating said ore in the presence of sufficient gaseous reducing agent to cause formation of iron chloride in the reaction zone of a reactor and introducing chlorine, gaseous reducing agent and ore therein at such a rate that the heat evolved by the chlorination reaction is developed with sufficient rapidity to maintain the temperature of about 850–1250° C. within at least a portion of said zone without externally heating said zone, whereby iron chloride is formed and volatilized.

9. A method of initiating and conducting the chlorination of an ilmenite ore which contains 15 to 50 percent of titanium and about 10 to 50 percent of iron which comprises introducing a combustible carbonaceous material into the reaction zone of a reactor, igniting said carbonaceous material and introducing oxygen into said zone to support combustion of the said carbonaceous material and to heat the interior of the reactor to a temperature above 600° C., introducing ore into the reactor, introducing a reducing agent and chlorine to initiate the reaction and continuing the addition of ore, reducing agent and chlorine at a rate such that the heat evolved by the reaction is developed with sufficient rapidity to maintain the temperature within at least a portion of the zone above 600° C. without externally heating the zone.

10. A continuous process of chlorinating a titanium bearing material containing about 15 to 50 percent of titanium which comprises chlorinating said material in the presence of sufficient gaseous reducing agent to cause formation of iron chloride in the reaction zone of a reactor and introducing chlorine, gaseous reducing agent and said material therein at such a rate that the heat evolved by the chlorination reaction is developed with sufficient rapidity to maintain the temperature above 600° C. within at least a portion of said zone without externally heating said zone, whereby iron chloride is formed and volatilized.

11. A continuous process of chlorinating a titanium bearing material containing about 15 to 50 percent of titanium which comprises chlorinating said material in the presence of sufficient gaseous reducing agent to cause formation of iron chloride in the reaction zone of a reactor and introducing chlorine, gaseous reducing agent and said material therein at such a rate that the heat evolved by the chlorination reaction is developed with sufficient rapidity to maintain the temperature of about 850–1250° C. within at least a portion of said zone without externally heating said zone, whereby iron chloride is formed and volatilized.

12. A method of chlorinating a titanium bearing material containing at least 15 percent titanium which comprises forming a pervious bed containing said material within a reactor, introducing chlorine and a gaseous reducing agent into a lower portion of said bed and fresh titanium bearing material into the upper portion of said bed and continuing the introduction of said material, chlorine and gaseous reducing agent at a rate such that the heat evolved by the reaction is developed with sufficient rapidity to maintain the temperature above 600° C. within at least a portion of the bed without externally heating the reactor.

13. A method of chlorinating a titanium oxide bearing material containing at least 15 percent titanium which comprises forming a pervious bed containing said material within a reactor, introducing chlorine and a gaseous reducing agent into a lower portion of said bed and fresh titanium oxide bearing material into the upper portion of said bed and continuing the introduction of said material, chlorine and gaseous reducing agent at a rate such that the heat evolved by the reaction is developed with sufficient rapidity to maintain the temperature above 700° C. within at least a portion of the bed without externally heating the reactor.

14. A method of chlorinating a titanium ore containing at least 15 percent titanium which comprises forming a pervious bed containing said ore within a reactor, introducing chlorine, and a gaseous reducing agent into a lower portion of said bed and fresh ore into the upper portion of said bed and continuing the introduction of said ore, chlorine and gaseous reducing agent at a rate such that the heat evolved by the reaction is developed with sufficient rapidity to maintain the temperature about 850–1250° C. within at least a portion of said bed without externally heating the reactor.

IRVING E. MUSKAT.
ROBERT H. TAYLOR.